(12) United States Patent
Sato

(10) Patent No.: US 12,128,713 B2
(45) Date of Patent: Oct. 29, 2024

(54) PNEUMATIC TIRE

(71) Applicant: TOYO TIRE CORPORATION, Itami (JP)

(72) Inventor: Yoshiki Sato, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 17/951,662

(22) Filed: Sep. 23, 2022

(65) Prior Publication Data

US 2023/0120001 A1   Apr. 20, 2023

(30) Foreign Application Priority Data

Oct. 18, 2021 (JP) ................................ 2021-170514

(51) Int. Cl.
*B60C 11/13* (2006.01)
*B60C 11/11* (2006.01)
*B60C 11/12* (2006.01)
*B60C 11/03* (2006.01)

(52) U.S. Cl.
CPC ........... *B60C 11/1392* (2013.01); *B60C 11/11* (2013.01); *B60C 11/1236* (2013.01); *B60C 2011/0346* (2013.01); *B60C 2200/14* (2013.01)

(58) Field of Classification Search
CPC ................. B60C 11/11; B60C 2200/14; B60C 2011/0381; B60C 11/1392
See application file for complete search history.

(56) References Cited

U.S. PATENT DOCUMENTS

| | | | | |
|---|---|---|---|---|
| D884,588 S | * | 5/2020 | Sato | ............................ D12/579 |
| 2012/0227882 A1 | * | 9/2012 | Kawakita | ............ B60C 11/1392 |
| | | | | 152/209.15 |
| 2016/0152091 A1 | * | 6/2016 | Yoshida | .............. B60C 11/0306 |
| | | | | 152/209.18 |
| 2019/0275845 A1 | * | 9/2019 | Herbst | ................ B60C 11/1353 |
| 2021/0276370 A1 | * | 9/2021 | Mizushima | ......... B60C 11/1392 |
| 2021/0331527 A1 | | 10/2021 | Sakamoto | |

FOREIGN PATENT DOCUMENTS

JP       2020-1664 A    1/2020

\* cited by examiner

*Primary Examiner* — Justin R Fischer
*Assistant Examiner* — Nicholas J Weiler
(74) *Attorney, Agent, or Firm* — WHDA, LLP

(57) ABSTRACT

A pneumatic tire of the present disclosure includes: a pair of main grooves, lateral grooves and longitudinal grooves, wherein a center land, repeats, in the tire circumferential direction, four center blocks, each of the four center blocks includes a recessed portion that is open to the main groove, the lateral groove or the longitudinal groove and has one end closed, when the recessed portions provided in the four center blocks are defined as first to fourth recessed portions, the first recessed portion and the second recessed portion extend in a direction inclined to one direction with respect to the tire equator line, and the third recessed portion and the fourth recessed portion extend in a direction inclined to another direction with respect to the tire equator line, and a groove width of each of the first to fourth recessed portions is 5.0 mm or more.

18 Claims, 3 Drawing Sheets

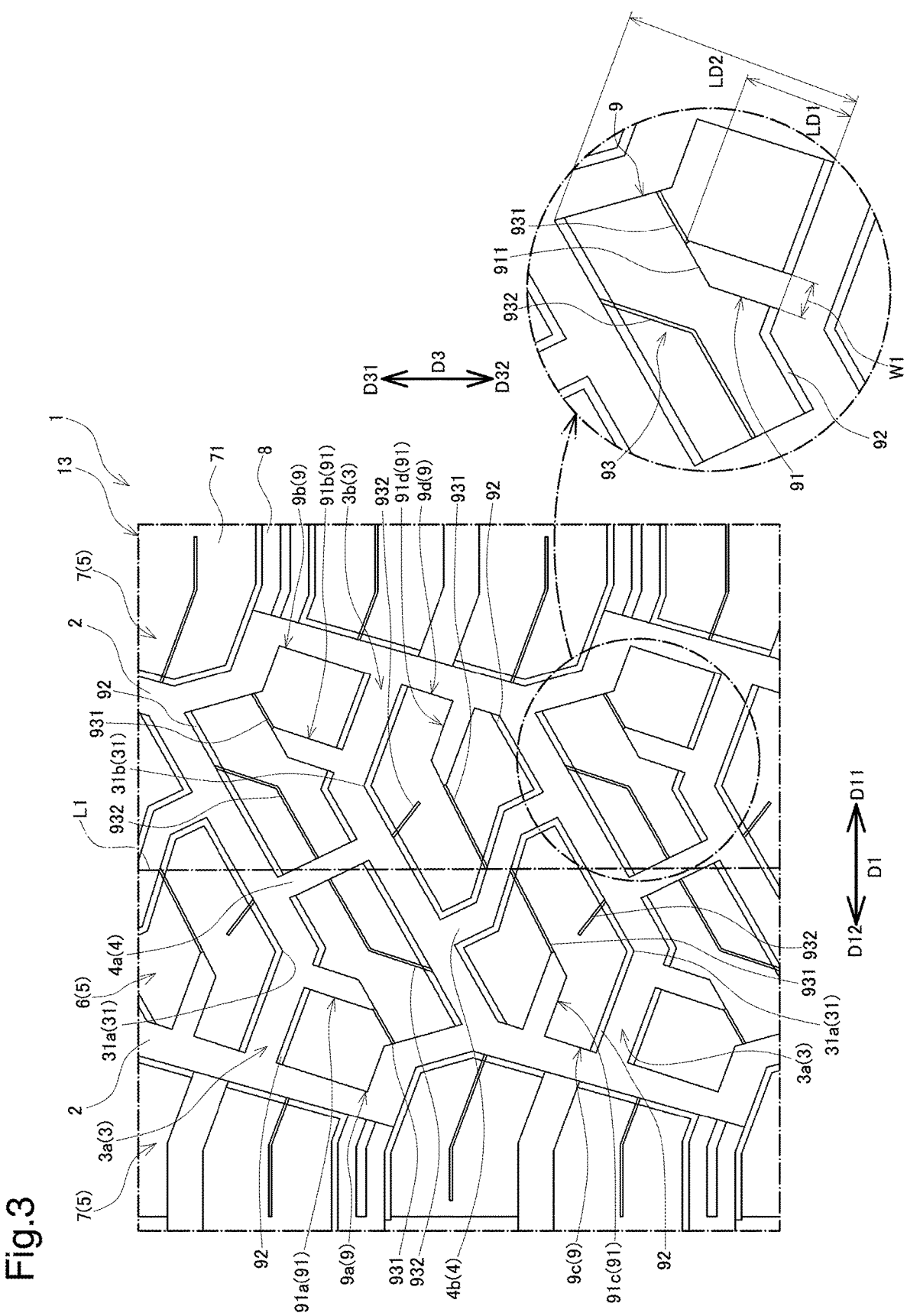

PNEUMATIC TIRE

CROSS-REFERENCE TO RELATED APPLICATIONS

The present application claims priority of Japanese Patent Application No. 2021-170514 filed on Oct. 18, 2021, the content of which is incorporated herein by reference.

BACKGROUND OF THE INVENTION

Field of the Invention

The present disclosure relates to a pneumatic tire.

Description of the Related Art

In an off-road pneumatic tire intended to run on a bad road including a muddy ground and a rock area, generally, a tread pattern is adopted, which is mainly composed of lateral grooves and blocks with many edge components. In order to improve running performance of such a tire, desirably, a traction effect by biting mud and rocks on a road surface is obtained in a plurality of directions. Moreover, it is important to ensure block rigidity in order to increase the traction effect.

Patent Document 1 describes an off-road pneumatic tire including: a pair of main grooves extending along a tire circumferential direction; lateral grooves which couple the pair of main grooves to each other; longitudinal grooves which couple, to each other, the lateral grooves adjacent to each other in the tire circumferential direction; and a plurality of center blocks sectioned by the pair of main grooves, the lateral grooves and the longitudinal grooves. The center blocks are provided with fine grooves open to the main grooves and recessed portions open to the lateral grooves, in which opening portions of both are different in opening direction from each other.

However, in Patent Document 1, the fine grooves open to the main grooves are those with such a small groove width as to be regarded equivalent to sipes regarding influences given to block rigidity and a groove area, and accordingly, are considered to have little or no traction effect by biting mud and rocks.

PRIOR ART DOCUMENT

Patent Document

Patent Document 1: JP-A-2020-1664

SUMMARY OF THE INVENTION

It is an object of the present disclosure to provide a pneumatic tire capable of achieving a traction effect in a plurality of directions.

A pneumatic tire of the present disclosure includes: a pair of main grooves which extend along a tire circumferential direction on both sides of a tire equator line of a tread, and section the tread into a three lines of lands; a plurality of lateral grooves which extend along a tire axial direction separately from one another in the tire circumferential direction and couple the pair of main grooves to each other; and a plurality of longitudinal grooves which extend along the tire circumferential direction between the pair of main grooves and couple the plurality of adjacent lateral grooves to each other, wherein a center land among the three lines of lands, the center land being located between the pair of main grooves, repeats, in the tire circumferential direction, four center blocks sectioned by the lateral grooves and the longitudinal grooves, each of the four center blocks includes a recessed portion that is open to the main groove, the lateral groove or the longitudinal groove and has one end closed, when the recessed portions provided in the four center blocks are defined as first to fourth recessed portions, the first recessed portion and the second recessed portion extend in a direction inclined to one direction with respect to the tire equator line, and the third recessed portion and the fourth recessed portion extend in a direction inclined to another direction with respect to the tire equator line, the first recessed portion is open in an opposite direction of a direction of the second recessed portion, and the third recessed portion is open in an opposite direction of a direction of the fourth recessed portion, and a groove width of each of the first to fourth recessed portions is 5.0 mm or more.

BRIEF DESCRIPTION OF THE DRAWINGS

FIG. 3 is a view of illustrating a tread pattern of the pneumatic tire according to the embodiment.

DETAILED DESCRIPTION OF THE PREFERRED EMBODIMENTS

Figure 1:
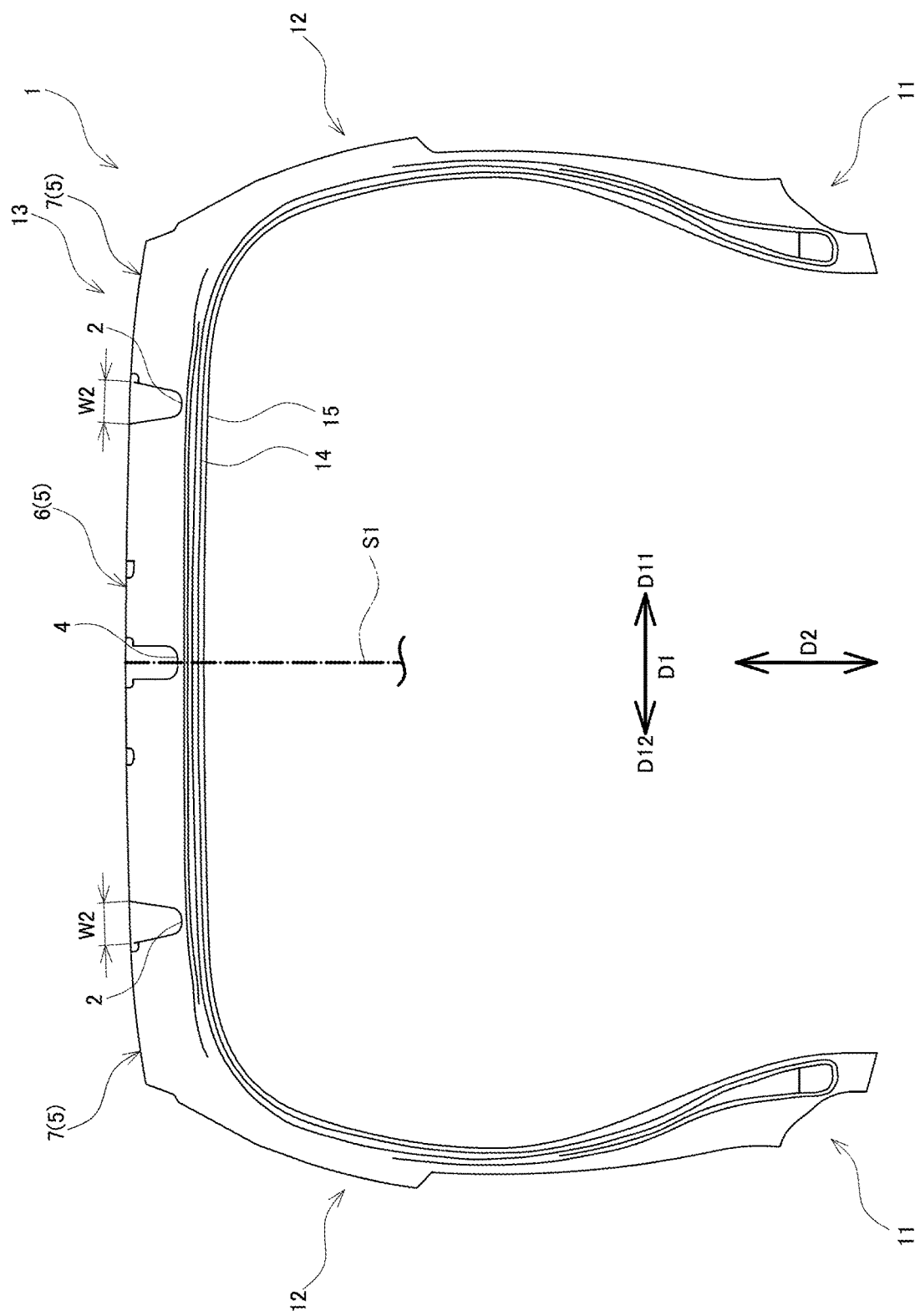
FIG. 1 is a cross-sectional view of a pneumatic tire according to an embodiment on a tire meridian plane.

Hereinafter, an embodiment of a pneumatic tire will be described with reference to FIGS. 1 to 3. Note that a dimensional ratio of the drawing does not necessarily coincide with an actual dimensional ratio in each of the drawings, and dimensional ratios in the respective drawings do not necessarily coincide with each other.

In each of the drawings, a first direction D1 is a tire axial direction D1 parallel to a tire rotation axis of a pneumatic tire (hereinafter, also simply referred to as a "tire") 1, a second direction D2 is a tire radial direction D2 that is a diameter direction of the tire 1, and a third direction D3 is a tire circumferential direction D3 around the tire rotation axis.

In the tire axial direction D1, the inner side is a side close to a tire equatorial plane S1, and the outer side is a side far from the tire equatorial plane S1. In the tire radial direction D2, the inner side is a side close to the tire rotation axis, and the outer side is a side far from the tire rotation axis. Moreover, one direction in the tire axial direction D1 is called a first axial direction D11, and an opposite direction of the first axial direction D11 is called a second axial direction D12. One direction in the tire circumferential direction D3 is called a first circumferential direction D31, and an opposite direction of the first circumferential direction D31 is called a second circumferential direction D32.

The tire equatorial plane S1 is a plane orthogonal to the tire rotation axis and located at the center of the tire 1 in the tire axial direction D1, and a tire meridian plane is a plane including the tire rotation axis and orthogonal to the tire equatorial plane S1. A tire equator line L1 is a line along which an outer surface of the tire 1 in the tire radial direction D2 intersects with the tire equatorial plane S1.

As illustrated in FIG. 1, the tire 1 includes: a pair of bead portions 11 and 11; a pair of sidewalls 12 and 12 extending outward in the tire radial direction D2 from the respective bead portions 11 and 11; a tread 13 continuous with outer ends of the pair of sidewalls 12 and 12 in the tire radial direction D2; a carcass ply 14 extending to be stretched between the pair of bead portions 11 and 11; and an inner liner 15 located on an innermost side of the tire 1. The tire 1 according to the present embodiment is an off-road tire intended to run on a bad road including a muddy ground and a rock area, but is not limited to this.

Figure 2:
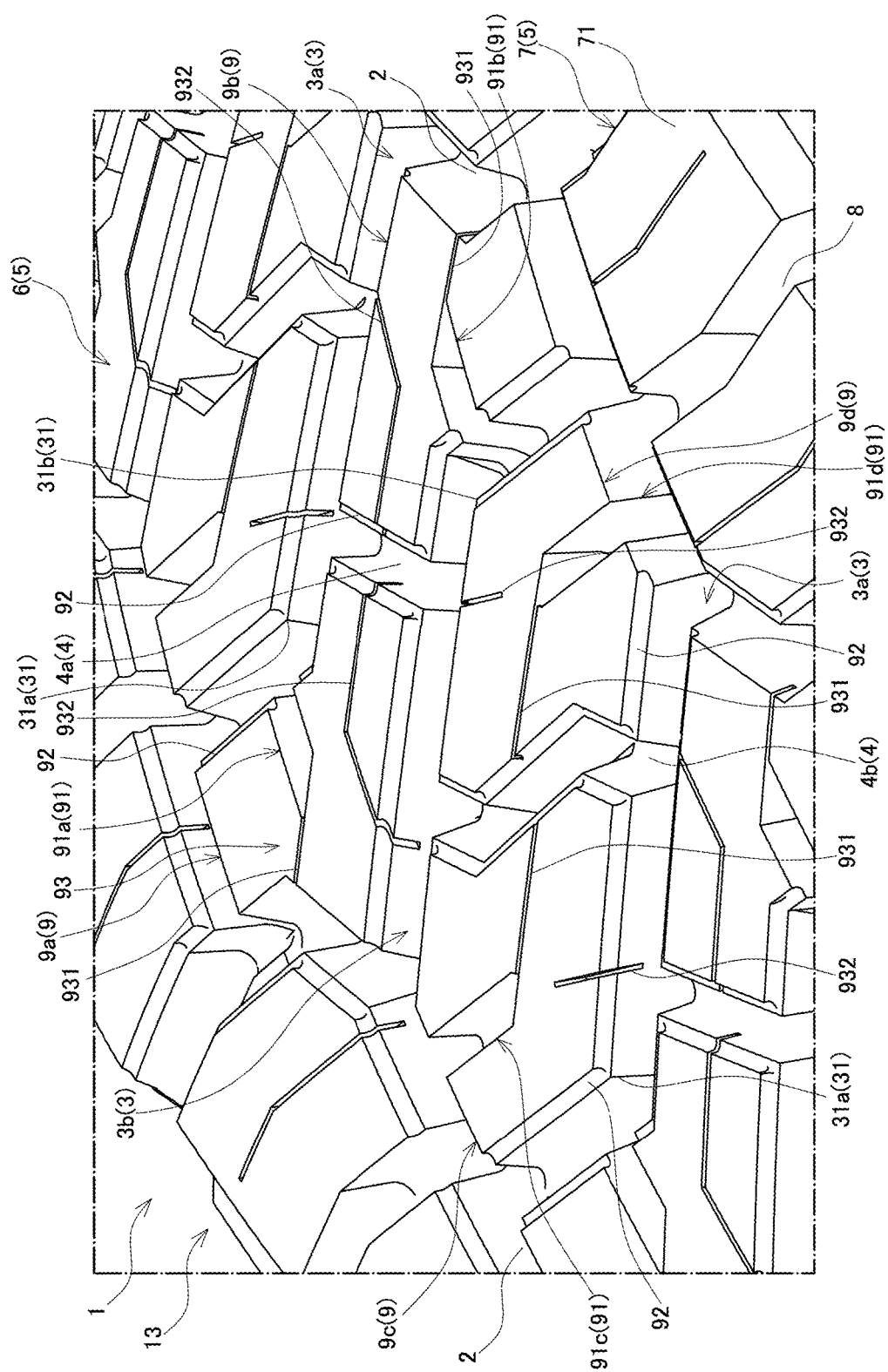
FIG. 2 is a perspective view illustrating a main part of the pneumatic tire according to the embodiment.

As illustrated in FIGS. 2 and 3, the tire 1 includes: a pair of main grooves 2 and 2 extending continuously along the tire circumferential direction D3 on both sides of the tire equator line L1 of the tread 13; a plurality of lateral grooves 3 which couple the pair of main grooves 2 to each other; and a plurality of longitudinal grooves 4 which couple, to each other, the plurality of lateral grooves 3 adjacent to each other. From a viewpoint of exerting a traction effect, preferably, the main grooves 2 extend while being bent in a zigzag fashion.

The plurality of lateral grooves 3 are arranged separately from one another in the tire circumferential direction D3. Then, the lateral grooves 3 extend along the tire axial direction D1. From a viewpoint of exerting the traction effect in a plurality of directions, preferably, the lateral grooves 3 are inclined with respect to the tire axial direction D1. In the present embodiment, a groove depth of the lateral grooves 3 is the same as a groove depth of the main grooves 2.

The lateral grooves 3 include bending points 31. Thus, edge components of center blocks 9 to be described later can be increased, and traction performance of the tire 1 can be improved. The lateral grooves 3 and 3 adjacent to each other in the tire circumferential direction D3 are called a first lateral groove 3a and a second lateral groove 3b. The bending points 31 provided on the respective lateral grooves 3a and 3b are called a first bending point 31a and a second bending point 31b. In the present embodiment, a position of the first bending point 31a of the first lateral groove 3a is different from a position of the second bending point 31b of the second lateral groove 3b in the tire axial direction D1. Note that the lateral grooves 3 are not limited to those described above.

The longitudinal grooves 4 extend along the tire circumferential direction D3 between the pair of main grooves 2. Each of the longitudinal grooves 4 couples the first lateral groove 3a and the second lateral groove 3b which are adjacent to each other in the tire circumferential direction D3. From the viewpoint of exerting the traction effect in the plurality of directions, preferably, the longitudinal grooves 4 are inclined with respect to the tire circumferential direction D3. In the present embodiment, the longitudinal grooves 4 extend discontinuously along the tire circumferential direction D3, and intersects with the first lateral groove 3a and the second lateral groove 3b substantially perpendicularly (80 degrees to 100 degrees).

The longitudinal groove 4 extending from the second lateral groove 3b to one side in the tire circumferential direction D3 is called a first longitudinal groove 4a, and the longitudinal groove 4 extending from the lateral groove 3 to the other side in the tire circumferential direction D3 is called a second longitudinal groove 4b. The first longitudinal groove 4a and the second longitudinal groove 4b are arranged so as to be adjacent to each other in the tire circumferential direction D3. A shape of the first longitudinal groove 4a is different from a shape of the second longitudinal groove 4b. Specifically, the first longitudinal groove 4a is formed into a straight line shape, and the second longitudinal groove 4b is formed into a substantially Z-shape. A groove depth of the longitudinal grooves 4 is the same as the groove depth of the main grooves 2 and the lateral groove 3. Note that such longitudinal grooves 4 are not limited to those described above.

The tread 13 includes three lines of lands 5 sectioned by the pair of main grooves 2. The three lines of lands 5 include: a center land 6 located between the pair of main grooves 2; and a pair of shoulder lands 7 and 7 located outside the main grooves 2 in the tire axial direction D1. The tire 1 includes shoulder lateral grooves 8 extending outward in the tire axial direction D1 from the main grooves 2. Each of the shoulder lands 7 is sectioned to a plurality of shoulder blocks 71 by the shoulder lateral grooves 8.

As illustrated in FIG. 3, the center land 6 includes a plurality of center blocks 9 sectioned by the lateral grooves 3, the first longitudinal grooves 4a and the second longitudinal grooves 4b. The center land 6 is formed in such a manner that four center blocks 9 adjacent to one another (first to fourth center blocks 9a to 9d to be described later) are repeatedly arranged in the tire circumferential direction D3. Shapes of the center blocks 9 are determined by shapes of the main grooves 2, the lateral grooves 3, the first longitudinal grooves 4a and the second longitudinal grooves 4b.

Each of the center blocks 9 includes a recessed portion 91 that is open to any of the main groove 2, the lateral groove 3, the first longitudinal groove 4a and the second longitudinal groove 4b and has one end closed. Such recessed portions 91 are arranged to the center blocks 9 in a one-to-one relationship. In the present embodiment, the recessed portions 91 are formed into a straight line shape. A wall surface 911 on one end of the recessed portion 91 is inclined with respect to an opening direction, and is parallel to a part of the lateral groove 3 adjacent thereto in an opposite direction (closing direction) of the opening direction of the recessed portion 91. Note that the recessed portions 91 are not limited to those described above. The opening direction of the recessed portion 91 is a direction from the wall surface 911 toward an opening position of the recessed portion 91, and is a direction along a central axis of the recessed portion 91.

From the viewpoint of exerting the traction effect, preferably, a groove width W1 of the recessed portion 91 is 5.0 mm or more. The groove width W1 of the recessed portion 91 refers to a groove width at the opening position of the recessed portion 91. Preferably, the groove width W1 of the recessed portion 91 is 50% to 70% of a groove width W2 (see FIG. 1) of each of the main grooves 2. Reasons for the above are as follows. The groove width W1 of the recessed portion 91 is set to 50% or more of the groove width W2 of the main groove 2, whereby the traction effect can be improved. Moreover, the groove width W1 of the recessed portion 91 is set to 70% or less of the groove width W2 of the main groove 2, whereby rigidity of the center block 9 can be ensured. Then, from a viewpoint of ensuring the rigidity of the center block 9 and exerting the traction effect, preferably, the recessed portion 91 extends with the groove width W1, which is fixed, from the opening position.

From the viewpoint of exerting the traction effect, preferably, a groove length LD1 of the recessed portion 91 is larger than the groove width W1 of the recessed portion 91. Moreover, from the viewpoint of ensuring the rigidity of the center block 9 and exerting the traction effect, preferably, the groove length LD1 of the recessed portion 91 is 30% to 70% of a length LD2 from the opening position of the recessed portion 91 to an end portion of the center block 9, which intersects with an extension line of the recessed portion 91.

From a viewpoint of ensuring wear resistance, preferably, a groove depth of the recessed portion 91 is 40% or more of the groove depth of the main grooves 2. In the present embodiment, the groove depth of the recessed portion 91 is the same as the groove depth of the main grooves 2, the lateral grooves 3 and the longitudinal grooves 4, but is not limited to this. For example, the groove depth of the recessed portion 91 may be smaller than the groove depth of the main grooves 2, the lateral grooves 3 and the longitudinal grooves 4. The groove width W1, groove length LD1 and groove depth of the recessed portion 91 are appropriately set based on a design of a tread pattern, block rigidity, the traction performance, drainage performance and the like.

Herein, it is defined that the center block 9 adjacent to the first longitudinal groove 4a in the second axial direction D12 is a first center block 9a, that the center block 9 adjacent to the first longitudinal groove 4a in the first axial direction D11 is a second center block 9b, that the center block 9 adjacent to the second longitudinal groove 4b in the second axial direction D12 is a third center block 9c, and that the center block 9 adjacent to the second longitudinal groove 4b in the first axial direction D11 is a fourth center block 9d. Moreover, it is defined that the recessed portions 91 provided in the first to fourth center blocks 9a, 9b, 9c and 9d are first to fourth recessed portions 91a to 91d, respectively. Further, the lateral groove 3 that intersects with the first longitudinal groove 4a on the first circumferential direction D31 side (intersects with the second longitudinal groove 4b on the second circumferential direction D32 side) is a first lateral groove 3a, and that the lateral groove 3 that intersects with the first longitudinal groove 4a on the second circumferential direction D32 side (intersects with the second longitudinal groove 4b on the first circumferential direction D31 side) is a second lateral groove 3b. Note that the first to fourth center blocks 9a, 9b, 9c and 9d are not limited to the positions described above. For example, it may be defined that the center block 9 adjacent to the first longitudinal groove 4a in the first axial direction D11 is the first center block 9a, and that the center block 9 adjacent to the second longitudinal groove 4b in the first axial direction D11 is the second center block 9b.

The first center block 9a is point-symmetric to the second center block 9b with respect to an arbitrary point on the tire equator line L1, and the third center block 9c is point-symmetric to the fourth center block 9d with respect to an arbitrary point on the tire equator line L1. Note that the first to fourth center blocks 9a to 9d are not limited to those described above. For example, the first center block 9a may be asymmetric to the second center block 9b, and the first center block 9a may be point-symmetric to the fourth center block 9d with respect to an arbitrary point on the tire equator line L1.

From a viewpoint of ensuring a balance in the traction performance between the plurality of directions, among the four groove widths W1 of the first to fourth recessed portions 91a to 91d, preferably, a groove width W1 that becomes maximum and a groove width W1 that becomes minimum individually range within ±20% with respect to an average value of the four groove widths W1. Further, from the viewpoint of ensuring the balance in the traction performance between the plurality of directions, among the four groove lengths LD1 of the first to fourth recessed portions 91a to 91d, preferably, a groove length LD1 that becomes maximum and a groove length LD1 that becomes minimum individually range within ±20% with respect to an average value of the four groove lengths LD1.

The first recessed portion 91a and the second recessed portion 91b extend in a direction inclined to one direction (first axial direction D11) with respect to the tire equator line L1, and the third recessed portion 91c and the fourth recessed portion 91d extend in a direction inclined to the other direction (second axial direction D12) with respect to the tire equator line L1. Such recessed portions 91 are inclined with respect to the tire equator line L1 (tire circumferential direction D3), whereby the traction can be generated in each of the tire axial direction D1 and the tire circumferential direction D3.

In the present embodiment, an inclination angle of the first recessed portion 91a with respect to the tire equator line L1 is the same as an inclination angle of the second recessed portion 91b with respect to the tire equator line L1. For example, the inclination angle of the first recessed portion 91a with respect to the tire equator line L1 may differ from the inclination angle of the second recessed portion 91b with respect to the tire equator line L1. The same as above also applies to the third recessed portion 91c and the fourth recessed portion 91d.

The opening direction of the first recessed portion 91a is opposite to the opening direction of the second recessed portion 91b, and the opening direction of the third recessed portion 91c is opposite to the opening direction of the fourth recessed portion 91d. In the present embodiment, the opening direction of the first recessed portion 91a is along the first circumferential direction D31, and the opening direction of the second recessed portion 91b is along the second circumferential direction D32. Then, the opening direction of the third recessed portion 91c is along the second axial direction D12, and the opening direction of the fourth recessed portion 91d is along the first axial direction D11.

The opening direction of the first recessed portion 91a or the second recessed portion 91b preferably form an angle of 45 degrees to 135 degrees with the opening direction of the third recessed portion 91c or the fourth recessed portion 91d, more preferably form an angle of 80 degrees to 100 degrees. In the present embodiment, the opening direction of the first recessed portion 91a forms an angle of 90 degrees with the opening directions of the third recessed portion 91c and the fourth recessed portion 91d. The same as above also applies to the opening direction of the second recessed portion 91b.

In the present embodiment, the opening direction of the first recessed portion 91a is parallel to a part of a wall surface of the first center block 9a adjacent to the main groove 2 on the second axial direction D12 side, and the opening direction of the second recessed portion 91b is parallel to a part of a wall surface of the second center block 9b adjacent to the main groove 2 on the first axial direction D11 side. Moreover, the opening direction of the third recessed portion 91c is parallel to a part of a wall surface of the third center block 9c adjacent to the first lateral groove 3a, and the opening direction of the fourth recessed portion 91d is parallel to a part of a wall surface of the fourth center block 9d adjacent to the second lateral groove 3b.

Preferably, one of the first to fourth recessed portions 91a to 91d is open to one of the pair of main grooves 2 and 2, and another one of the first to fourth recessed portions 91a to 91d is open to the other of the pair of main grooves 2 and 2. In the present embodiment, the third recessed portion 91c is open to the main groove 2 on the second axial direction D12 side, and the fourth recessed portion 91d is open to the main groove 2 on the first axial direction D11 side.

Moreover, still another one of the first to fourth recessed portions 91a to 91d is open to the lateral groove 3, and the remaining one of the first to fourth recessed portions 91a to 91d is open to the lateral groove 3 adjacent to the described lateral groove 3 in the tire circumferential direction D3. In the present embodiment, the second recessed portion 91b is open to the second lateral groove 3b, and the first recessed portion 91a is open to the first lateral groove 3a.

Two of the first to fourth recessed portions 91a to 91d are open to one side in the tire circumferential direction D3 on one side of the tire equatorial plane S1 in the tire axial direction D1. Moreover, other two of the first to fourth recessed portions 91a to 91d are open to the other side in the tire circumferential direction D3 on the other side of the tire equatorial plane S1 in the tire axial direction D1. In the present embodiment, the first recessed portion 91a and the third recessed portion 91c are open to the first circumferential direction D31 side, and the second recessed portion 91b and the fourth recessed portion 91d are open to the second circumferential direction D32 side.

From a viewpoint of ensuring the rigidity of the center block 9, preferably, the recessed portion 91 open to the lateral groove 3 is open to a recessed side (protruding side of the lateral groove 3) in the tire circumferential direction D3 of the center block 9. In the present embodiment, the first recessed portion 91a is open to a recessed side (protruding side of the first lateral groove 3a) in the tire circumferential direction D3 of the first center block 9a, and the second recessed portion 91b is open to a recessed (protruding side of the second lateral groove 3b) in the tire circumferential direction D3 of the second center block 9b. Note that the opening directions and opening positions of the first to fourth recessed portions 91a to 91d are not limited to those described above.

As illustrated in FIGS. 2 and 3, the center block 9 includes a step portion 92 recessed inside in the tire radial direction D2. With such a configuration, the traction effect is improved, and in addition, rigidity of the edge portion of the center block 9 can be ensured. In the present embodiment, the step portion 92 is arranged on outer peripheral edges of the center block 9, which are in contact with the lateral groove 3 and the longitudinal groove 4.

The center block 9 includes a plurality of sipes 93. The sipes 93 extend in a straight line shape or a bending line shape, but are not limited to this. A width of the sipes 93 is 1.5 mm or less. A depth of the sipes 93 is smaller than the groove depth of the recessed portion 91. The sipes 93 include: first sipes 931, each of which is open to the recessed portion 91; and second sipes 932, each of which is unopen (unconnected) to the recessed portion 91. In the second sipe 932, one end thereof is open to the lateral groove 3, and the other end thereof is open to the longitudinal groove 4 or closed.

The first sipe 931 has one end open to one end of the recessed portion 91 and the other end open to the main groove 2, the lateral groove 3 or the longitudinal groove 4. That is, the center block 9 is divided by the first sipe 931 smaller in width than the groove width W1 of the recessed portion 91. Thus, uneven wear of the center block 9, which is caused by providing the recessed portion 91, can be suppressed. The first sipe 931 extends in a direction different from that of the recessed portion 91. This can improve the traction performance of the tire 1. Then, the first sipe 931 extends along the wall surface 911 on one end of the recessed portion 91, and extends in parallel to a part of the adjacent lateral groove 3.

In the present embodiment, in the first center block 9a, the other end of the first sipe 931 is open to the main groove 2 on the second axial direction D12 side, and the other end of the second sipe 932 is open to the first longitudinal groove 4a. In the second center block 9b, the other end of the first sipe 931 is open to the main groove 2 on the first axial direction D11 side, and the other end of the second sipe 932 is open to the first longitudinal groove 4a. In each of the third and fourth center blocks 9c and 9d, the other end of the first sipe 931 is open to the second longitudinal groove 4b, and the other end of the second sipe 932 is closed. Note that the first sipe 931 and the second sipe 932 are not limited to those described above, and are appropriately set in consideration of the design of the tread pattern, the rigidity of the center block 9, the traction performance and the like.

As described above in the present embodiment, preferably, the tire 1 is configured to include: a pair of main grooves 2 which extend along a tire circumferential direction D3 on both sides of a tire equator line L1 of a tread 13, and section the tread 13 into a three lines of lands 5; a plurality of lateral grooves 3 which extend along a tire axial direction D1 separately from one another in the tire circumferential direction D3 and couple the pair of main grooves 2 to each other; and a plurality of longitudinal grooves 4 which extend along the tire circumferential direction D3 between the pair of main grooves 2 and couple the plurality of adjacent lateral grooves 3 to each other, wherein a center land 6 among the three lines of lands 5, the center land 6 being located between the pair of main grooves 2, repeats, in the tire circumferential direction D3, four center blocks 9a, 9b, 9c and 9d sectioned by the lateral grooves 3 and the longitudinal grooves 4, each of the four center blocks 9a, 9b, 9c and 9d includes a recessed portion 91a, 91b, 91c and 91d that is open to the main groove 2, the lateral groove 3 or the longitudinal groove 4 and has one end closed, when the recessed portions 91a, 91b, 91c and 91d provided in the four center blocks 9a, 9b, 9c and 9d are defined as first to fourth recessed portions 91a, 91b, 91c and 91d, the first recessed portion 91a and the second recessed portion 91b extend in a direction inclined to one direction with respect to the tire equator line L1, and the third recessed portion 91c and the fourth recessed portion 91d extend in a direction inclined to another direction with respect to the tire equator line L1, the first recessed portion 91a is open in an opposite direction of a direction of the second recessed portion 91b, and the third recessed portion 91c is open in an opposite direction of a direction of the fourth recessed portion 91d, and a groove width W1 of each of the first to fourth recessed portions 91a, 91b, 91c and 91d is 5.0 mm or more.

With such a configuration, the opening directions of the first to fourth recessed portions 91a to 91d are caused to differ from one another, and the groove width W1 of each thereof is ensured, whereby the traction performance can be exerted in the plurality of directions. This can improve the traction performance of the tire 1 in the plurality of directions. Moreover, one end of the recessed portion 91 is closed, whereby the center block 9 can be prevented from being divided by the recessed portion 91. Thus, the traction effect can be favorably exerted by ensuring the rigidity of the center block 9.

Further, as in the present embodiment, in the tire 1, such a configuration is preferable, in which an opening direction of the first recessed portion 91a or the second recessed portion 91b forms an angle of 45 degrees to 135 degrees with an opening direction of the third recessed portion 91c or the fourth recessed portion 91d.

With such a configuration, the opening directions of the first to fourth recessed portions 91a to 91d can be varied. This can generate tractions with a good balance in the plurality of directions.

Moreover, as in the present embodiment, in the tire 1, such a configuration is preferable, in which one of the first to fourth recessed portions 91*a*, 91*b*, 91*c* and 91*d* is open to one of the pair of main grooves 2, and another one of the first to fourth recessed portions 91*a*, 91*b*, 91*c* and 91*d* is open to another of the pair of main grooves 2.

With such a configuration, it becomes easy for water that has entered the recessed portion 91 to flow to the main groove 2. Thus, water can be drained efficiently from the recessed portion 91 toward the main groove 2, and the drainage performance of the tire 1 can be improved.

Further, as in the present embodiment, in the tire 1, such a configuration is preferable, in which still another one of the first to fourth recessed portions 91*a*, 91*b*, 91*c* and 91*d* is open to the lateral groove 3, and a remaining one of the first to fourth recessed portions 91*a*, 91*b*, 91*c* and 91*d* is open to a lateral groove 3 adjacent to the lateral groove 3 in the tire circumferential direction D3.

With such a configuration, the first to fourth recessed portions 91*a* to 91*d* are opened to the grooves 2 and 3 different from each other, whereby the rigidity of the whole of the four center blocks 9*a* to 9*d* can be approximated to be uniform. This can increase the uneven wear resistance performance of the tire 1.

Note that the tire 1 is not limited to the configuration of the embodiment described above and is not limited to the operation and effect described above. Moreover, as a matter of course, the tire 1 can be modified in various ways within the scope without departing from the spirit of the present invention. For example, it is a matter of course that one or more configurations, methods, and the like according to various modification examples described below may be arbitrarily selected and adopted in the configuration, method, and the like according to the embodiment described above.

In the present embodiment, the groove width W1 of the recessed portion 91 is constant from the opening to the wall surface 911 on one end, but is not limited to this. For example, the groove width W1 of the recessed portion 91 may extend to be wider from such one end to the opening. This makes it easy for water to flow in the opening direction of the recessed portion 91, and therefore, the drainage performance of the tire 1 can be improved.

What is claimed is:

1. A pneumatic tire comprising:
   a pair of main grooves which extend along a tire circumferential direction on both sides of a tire equator line of a tread, and section the tread into a three lines of lands;
   a plurality of lateral grooves which extend along a tire axial direction separately from one another in the tire circumferential direction and couple the pair of main grooves to each other; and
   a plurality of longitudinal grooves which extend along the tire circumferential direction between the pair of main grooves and couple the plurality of adjacent lateral grooves to each other, wherein
   a center land among the three lines of lands, the center land being located between the pair of main grooves, repeats, in the tire circumferential direction, four center blocks sectioned by the lateral grooves and the longitudinal grooves,
   each of the four center blocks includes a recessed portion that is open to the main groove, the lateral groove or the longitudinal groove and has one end closed,
   when the recessed portions provided in the four center blocks are defined as first to fourth recessed portions, the first recessed portion and the second recessed portion extend in a direction inclined to one direction with respect to the tire equator line, and the third recessed portion and the fourth recessed portion extend in a direction inclined to another direction with respect to the tire equator line,
   the first recessed portion is open in an opposite direction of a direction of the second recessed portion, and the third recessed portion is open in an opposite direction of a direction of the fourth recessed portion,
   a groove width of each of the first to fourth recessed portions is 5.0 mm or more,
   the four center blocks are respectively first through fourth center blocks, the first center block being point-symmetric to the second center block with respect to an arbitrary point on the tire equator line, and the third center block being point-symmetric to the fourth center block with respect to an arbitrary point on the tire equator line,
   the first center block and the second center block are directly adjacent to each other in the tire axial direction, and
   the third center block and the fourth center blocks are directly adjacent to each other in the tire axial direction.

2. The pneumatic tire according to claim 1, wherein an opening direction of the first recessed portion or the second recessed portion forms an angle of 45 degrees to 135 degrees with an opening direction of the third recessed portion or the fourth recessed portion.

3. The pneumatic tire according to claim 1, wherein
   one of the first to fourth recessed portions is open to one of the pair of main grooves, and
   another one of the first to fourth recessed portions is open to another of the pair of main grooves.

4. The pneumatic tire according to claim 3, wherein still another one of the first to fourth recessed portions is open to the lateral groove, and a remaining one of the first to fourth recessed portions is open to a lateral groove adjacent to the lateral groove in the tire circumferential direction.

5. The pneumatic tire according to claim 4, wherein the recessed portion open to the lateral groove among the first to fourth recessed portions is open to a recessed side in the tire circumferential direction of the center block.

6. The pneumatic tire according to claim 1, wherein the main grooves extend while being bent in a zigzag fashion.

7. The pneumatic tire according to claim 6, wherein the lateral groove includes a bending point and is inclined with respect to the tire axial direction.

8. The pneumatic tire according to claim 7, wherein, when the bending points provided on the lateral grooves adjacent to each other in the tire circumferential direction are defined as a first bending point and a second bending point, a position of the first bending point in the tire axial direction is different from a position of the second bending point in the tire axial direction.

9. The pneumatic tire according to claim 1, wherein the groove widths of the recessed portions are 50% to 70% of a groove width of the main grooves.

10. The pneumatic tire according to claim 9, wherein, among four groove widths of the first to fourth recessed portions, a groove width that becomes maximum and a groove width that becomes minimum individually range within ±20% with respect to an average value of the four groove widths.

11. The pneumatic tire according to claim 1, wherein groove lengths of the recessed portions are larger than the groove widths of the recessed portions.

12. The pneumatic tire according to claim 11, wherein the groove lengths of the recessed portions are 30% to 70% of a length from an opening position of the recessed portion to an end portion of the center block, the end portion intersecting with an extension line of the recessed portion.

13. The pneumatic tire according to claim 12, wherein, among four groove lengths of the first to fourth recessed portions, a groove length that becomes maximum and a groove length that becomes minimum individually range within ±20% with respect to an average value of the four groove lengths.

14. The pneumatic tire according to claim 1, wherein an opening direction of the first recessed portion or the second recessed portion forms an angle of 80 degrees to 100 degrees with an opening direction of the third recessed portion or the fourth recessed portion.

15. The pneumatic tire according to claim 1, wherein the first recessed portion and the third recessed portion are open to one side in the tire circumferential direction on one side of the tire equator line in the tire axial direction, and the second recessed portion and the fourth recessed portion are open to another side in the tire circumferential direction on another side of the tire equator line in the tire axial direction.

16. The pneumatic tire according to claim 1, wherein
each of the four center blocks includes a step portion recessed inside in the tire radial direction, and
the step portion is arranged on outer peripheral edges of the center block, the outer peripheral edges being in contact with the lateral groove and the longitudinal groove.

17. The pneumatic tire according to claim 1, wherein
each of the four center blocks includes a plurality of sipes, and
the sipes include a first sipe open to the recessed portion and a second sipe unopen to the recessed portion.

18. The pneumatic tire according to claim 17, wherein the first sipe has one end open to one end of the recessed portion and another end open to the main groove, the lateral groove or the longitudinal groove.

* * * * *